United States Patent [19]

Moledina et al.

[11] Patent Number: 5,678,033
[45] Date of Patent: Oct. 14, 1997

[54] MULTI-STAGE INTERPOLATION PROCESSOR

[76] Inventors: Riaz A. Moledina, 3250 Woodside Rd., Woodside, Calif. 94062-2555; Kok S. Chen, 870 E. El Camino Real, #425, Sunnyvale, Calif. 94087; Iue-Na Swen, 22395 Saint Andrews Ave., Cupertino, Calif. 95014

[21] Appl. No.: 487,967

[22] Filed: Jun. 6, 1995

[51] Int. Cl.$^6$ ............................................. G06F 7/00
[52] U.S. Cl. ............................................. 395/502; 358/525
[58] Field of Search ..................... 395/131, 163, 395/502; 345/150, 153, 154, 199; 358/525

[56] References Cited

U.S. PATENT DOCUMENTS

| | | | |
|---|---|---|---|
| 4,275,413 | 6/1981 | Sakamoto | 358/525 |
| 4,334,240 | 6/1982 | Franklin | 358/525 |
| 4,511,989 | 4/1985 | Sakamoto | 364/723 |
| 5,412,491 | 5/1995 | Bachar | 358/500 |
| 5,428,465 | 6/1995 | Kanamori | 358/518 |
| 5,436,739 | 7/1995 | Imao | 358/518 |
| 5,479,272 | 12/1995 | Saito | 358/518 |
| 5,519,515 | 5/1996 | Komatsu | 358/518 |
| 5,541,742 | 7/1996 | Imao | 358/518 |

OTHER PUBLICATIONS

"A Very High Speed Very High Accuracy Color Correction Utility", *The Barco Chameleon ASIC*, pp. 1–7 (Mar. 1993).
*Product Standards Specifications*, Matsushita Electronics Corp., Product Name: MN5515, Version 4, pp. 1–33 (Dec. 21, 1994).

Primary Examiner—Tod R. Swann
Assistant Examiner—Christopher S. Chow

[57] ABSTRACT

Disclosed is a technique for N-dimensional image data interpolation processing utilizing a multi-stage technique. Each stage processes one of the N-dimensions to constrain output data in that dimension. Subsequent processing in successive stages only occurs within the confines of the constrained output of the previous stage. Multiple data values can be simultaneously processed in the different stages, to pipeline the interpolation process.

11 Claims, 4 Drawing Sheets

MULTI-STAGE INTERPOLATION PROCESSOR

FIELD OF THE INVENTION

The present invention relates to the interpolation of data and, in particular, to a process and apparatus for the interpolation of multi-dimensional data, such as color image data.

BACKGROUND OF THE INVENTION

In an imaging system having color graphics, it is desirable to generate color images on many types of output devices such as computer display screens and printers. However, due to inherent differences between such devices, color data that represents a certain color in one device may not match the same color output in another. To ensure color matching between devices, it is necessary to translate color data when transmitting it between devices. There are several methods in which this is presently done, and, in general, most methods involve a color look-up table (LUT). The color LUT functions to translate color data corresponding to a first display device (referred to as the source device) to color data corresponding to a second device (referred to as the destination device). The LUT stores color values corresponding to the destination device and functions such that, when it is indexed with source device image data, it provides corresponding translated color data to the destination device.

Generally, in color reproduction in an imaging system, each color input and output device is characterized as having a range, or gamut, of colors that define a corresponding color space. Display screens generally represent colors in a red, green, blue (RGB) color space. Printers, on the other hand, typically represent colors in a cyan, magenta, yellow, and black (CMYK) color space.

Typically, the manner in which color information is translated from a source color space to a destination color space is to initially translate the color data from the source device to a device-independent color space value. One well-known device-independent color space is the Cie-standard ABC color space. If the source device is properly calibrated, this translation is well-known and may be performed either by translation equations, or by a standardized color LUT.

After translating a color value from the source color space to the device-independent color space, the information is once again translated. This time the information is translated from the device-independent color space to the destination device color space. This transformation may be accomplished by using a color LUT that corresponds to the destination device, by use of translation equations, or by use of color transform algorithms.

A LUT contains data which corresponds to an output transfer function, which transfer function translates input image data to output image data in such a way that image color reproduction accuracy is maintained between a source and a destination device. The entire gamut of colors within a given color space may encompass thousands or even millions of distinct colors. Due to practical limits on the size of the memory that can be used to store the color look-up table, however, only discrete data points within the gamut are stored in the color LUT. As a result, it is often necessary to interpolate between data points stored in a color LUT to determine desired output color for a destination device.

Interpolation involves calculations based on geometric factors, to determine output values which correspond to a reliable reproduction of a source device color on a destination device. Interpolation for color image data is multi-dimensional in nature, where each dimension corresponds to one component of the color space for the source device. If the source device is a display monitor which represents colors in an RGB color space, for example, three-dimensional interpolation is required.

In a typical scenario wherein a source device is a video display, and a destination device is a printer, interpolation may involve taking input color image data values corresponding to a pixel from the video display and applying a known transform to determine output color image data values which correspond to accurate color reproduction of the pixel in a printed point on the printer. This process may or may not go though the intermediate medium of a device-independent color space.

It is an object of the present invention to provide a system for performing interpolation of multi-dimensional data, such as that stored in color LUTs, which provides a method and system for transformation, or translation, of such data.

It is a further object of the present invention to provide a system for performing interpolation processing of color image data, wherein image attributes, corresponding to each of the components of a color space, are individually processed on a dimension-by-dimension basis.

SUMMARY OF THE INVENTION

The aforementioned and other objects of the invention are achieved by providing a system for multi-dimensional interpolation processing of input data, wherein the input data is analyzed for a single dimensional parameter at individual processing levels or stages.

The present invention operates by performing interpolation processing according to a multi-level, or multi-stage analysis wherein each level of processing is dedicated to a single dimensional attribute of the data. That is to say, at each level or stage of processing, an individual dimensional attribute is assessed to determine interpolation values for the particular dimension.

The output data from a given level is restricted to the interpolation values arrived upon for the particular dimension, so that subsequent processing of the remaining dimensions need only be analyzed within the range of values determined by the previous processing.

Hence, for an exemplary scenario wherein input data comprising data points each having X, Y and Z-dimensional attributes are involved, the inventive arrangement first analyzes the data with respect to the X-dimensional attribute in accordance with a known X-dimensional transform. The output of such analysis is output interpolation data which is constrained in the X-dimension. Subsequent processing occurs for the Y-dimensional attributes (in accordance with a known Y-dimensional transform), and operates on the output determined by the preceding X-dimensional processing. Consequently, the interpolation processing of the Y-dimensional data is reduced, as it is only performed for the interpolation values determined by X-dimensional processing, and not over the entire range of X values.

Output from the Y-dimensional interpolation assessment has fixed interpolation values for both the X and Y dimensions. Accordingly, Z-dimensional processing is expedited, as such processing is performed on output data whose range of X and Y values has been reduced by preceding processing.

Other objects and advantages of the invention will become readily apparent from the drawings and detailed description set out below.

DETAILED DESCRIPTION OF THE INVENTION

To facilitate an understanding of the present invention, it is described hereinafter in the context of its implementation in a color imaging system of the type in which three-dimensional color space data for an RGB monitor is converted into corresponding data values for a printer that represents colors in a three-component or four-component color space. It will be appreciated, however, that this disclosed embodiment is exemplary, and that the invention can find practical utility in any environment in which interpolation of multi-dimensional data values is carried out.

Figure 1:
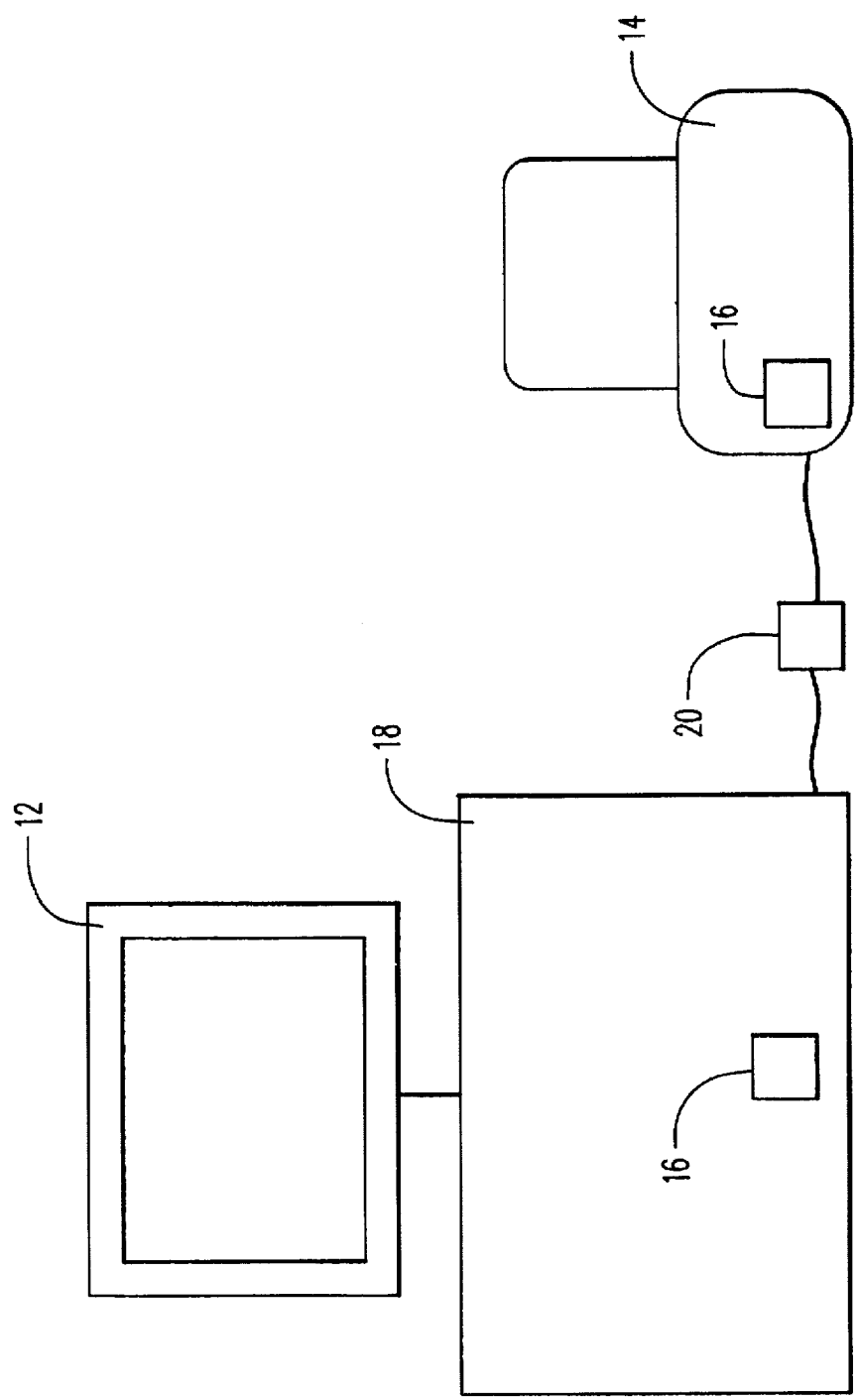
FIG. 1 depicts an exemplary computing system in which an interpolation processor in accordance with the present invention may be employed.

FIG. 1 shows an exemplary computer system in which the present invention may be utilized. In this type of system, image data from a source device in the form of a display 12 is interpolated to provide output data to a destination device in the form of a printer 14. For example, the display 12 may represent colors in a red-green-blue (RGB) color space, whereas the printer may operate in a cyan-magenta-yellow (CMY) or cyan-magenta-yellow-black (CMYK) color space. When an image appearing on the display is to be printed on the printer, it must be converted from the display's color space into that of the printer's color space. Typically, this is done by retrieving conversion values from a look-up table. Since the look-up table may not store a value for every possible color in the color gamuts of the source and destination devices, interpolation of the retrieved value may be required.

In a preferred embodiment, color interpolation processing is handled by software which controls the operation of a color interpolation processor 16 which can be located in the printer 14, or within a CPU 18 or embodied in a separate device 20 located between the printer 14 and the CPU 18. The color interpolation processor 16 may be an application specific integrated circuit (ASIC). Input image data from the source display 12 is provided to the interpolation processor 16. The interpolation processor 16 interpolates the input data and provides the output to the destination printer 14 to generate a printed image.

A detailed explanation of interpolation processing in accordance with the present invention is given below with respect to one- and three-dimensional processing. However, it is within the scope of the present invention to apply the present invention to processing of data having any number of dimensions. Furthermore, while the present invention is described with respect to color data, the invention may be applied to interpolation processing of other image attributes including, but not limited to, grayscale values, half tones, hues, and shading or any other application that requires multi-dimensional interpolation.

Figure 2:
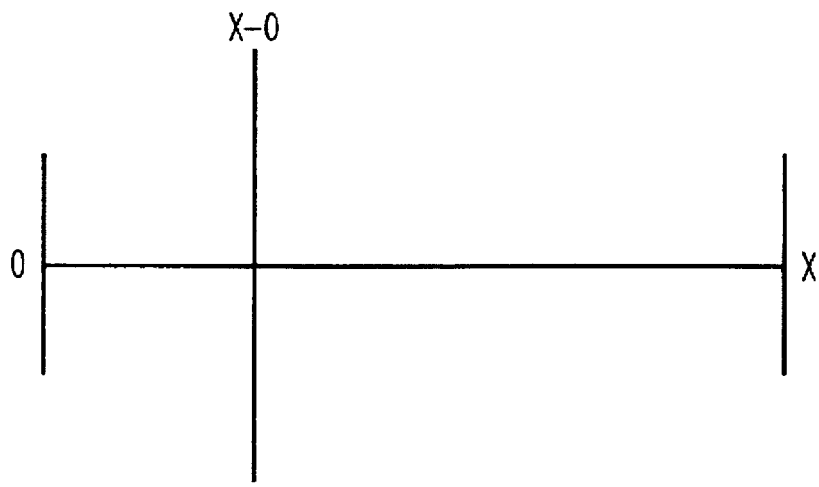
FIG. 2 depicts an example of one-dimensional interpolation processing.

FIG. 2 depicts a case exemplifying one-dimensional interpolation processing. A zero point on an axis represents one value that might be retrieved from a color conversion look-up table, while another point X may represent the next adjacent value stored in the table. This input data is used to linearly interpolate between values of $V_0$ and $V_X$ found at the two points 0 and X, respectively, to determine a desired interpolated value $V_{X-0}$ at point X–0. The resulting fractional distance X–0, divided by the distance between X and 0, is denoted as the function $F_X$. The value at X–0 is given by:

$$V_{X-0} = V_0 + (V_X - V_0) F_X$$

Figure 3:
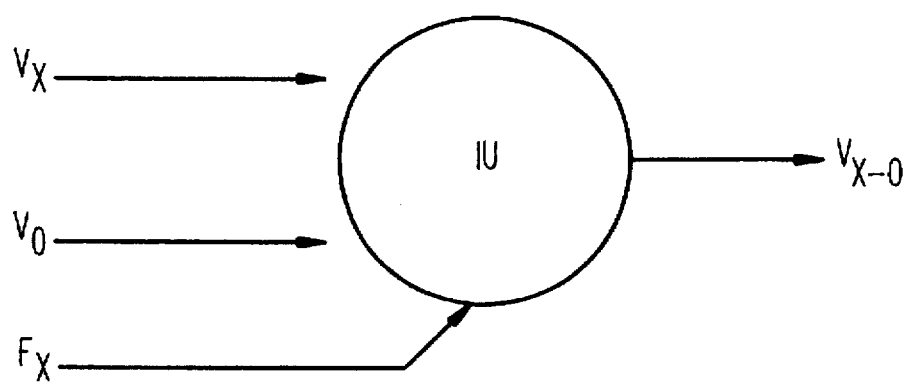
FIG. 3 depicts a one-dimensional interpolation unit.

A corresponding structure for implementing such a function may be referred to as an interpolation unit (IU) 22 depicted in FIG. 3. The interpolation unit 22 may represent a software process carried out within the interpolation processor 16, or may be a hardware arrangement that consists of adders and multipliers for implementing the function represented by the equation set forth above. In any event, the IU structure is provided for explanatory purposes, and the particular means utilized by the IU for executing the equation(s) is not critical to the invention.

Figure 4:
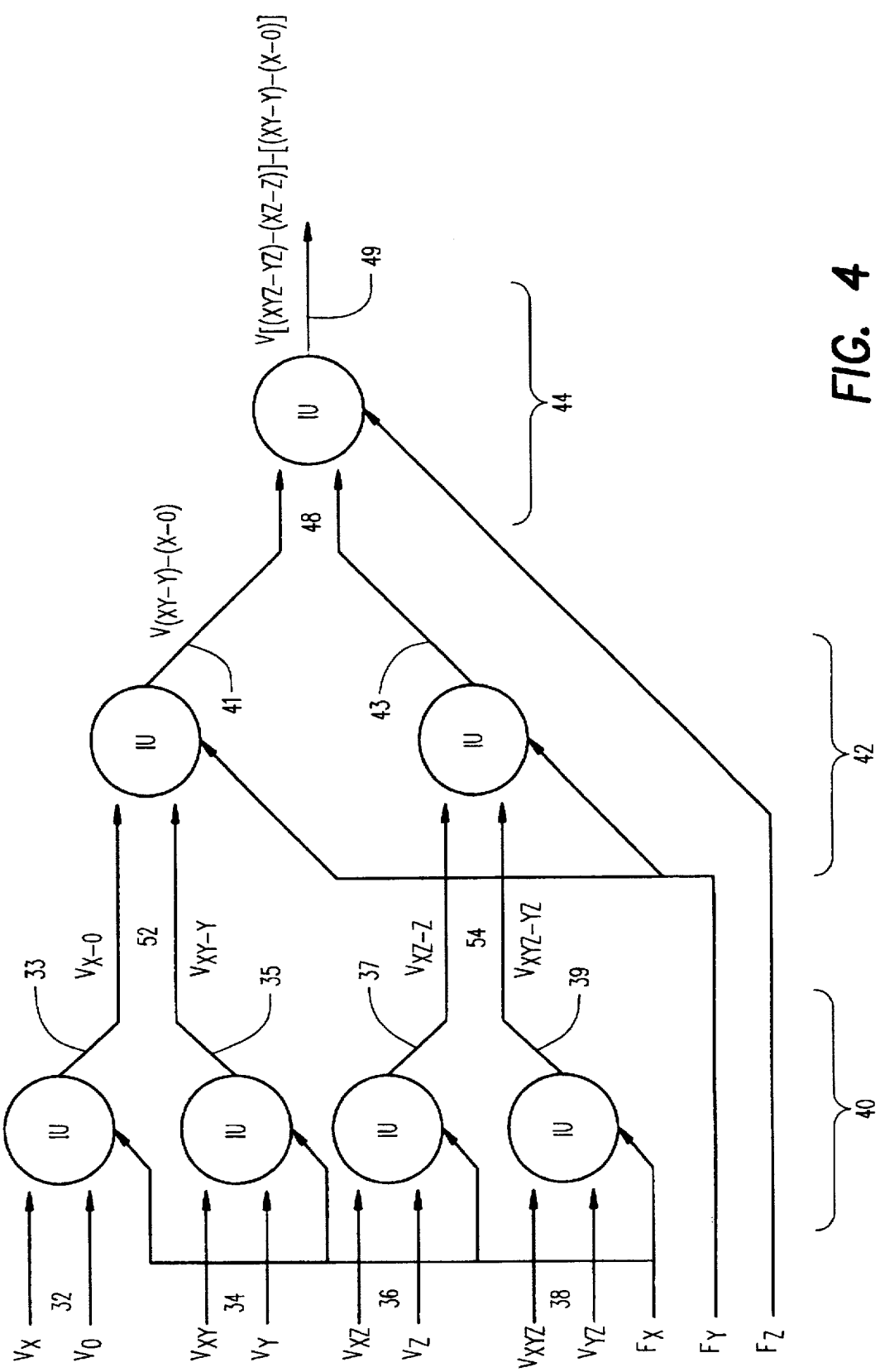
FIG. 4 depicts a three-dimensional interpolation unit.

An arrangement of a number of IUs in a multi-stage structure is capable of providing a high performance multidimensional interpolation engine. In such an arrangement, the depth of the structure, that is, the number of stages, is related to the number of dimensions of the image data being interpolated. A set, or array, of IUs at each stage provides processing for a particular attribute or dimension. A three-dimensional interpolation processor having three processing stages is shown in FIG. 4. Such a processor is capable of interpolating three-dimensional color space data, such as that for an RGB color space, for example.

A detailed analysis for three-dimensional interpolation processing is provided, as follows, with respect to FIGS. 4 through 6. It should be noted that the following description is merely exemplary and that any number of I/O dimensions, or attributes, may be involved in practicing the present invention.

Figure 5:
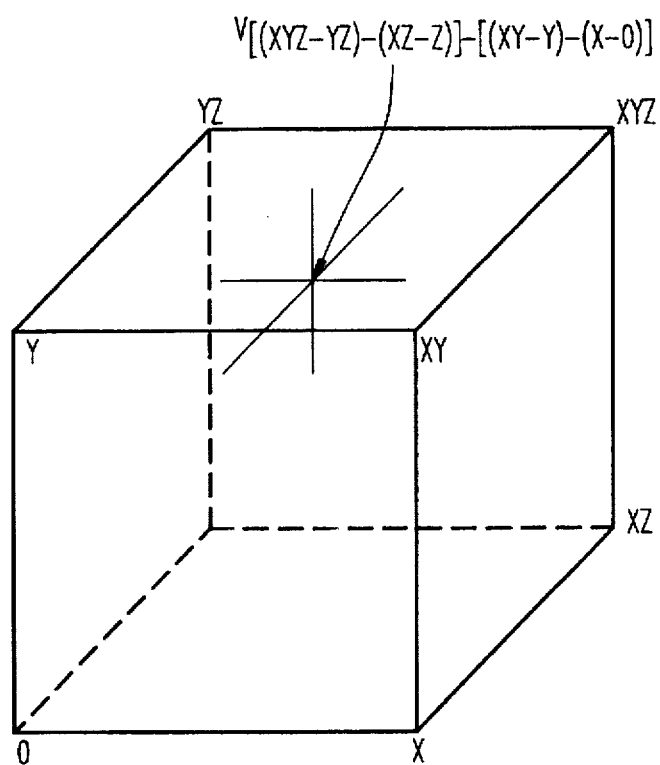
FIG. 5 depicts a three-dimensional interpolation processing color space having an output value indicated therein.

A three dimensional color space can be graphically represented as shown in FIG. 5. The X, Y, and Z dimensions of the representation may correspond to the red, green, and blue components of an RGB color space, the cyan, magenta, and yellow components of a CMY color space, on the three generic components of the device-independent CIE-ABC color space. The present invention operates in a fashion which quickly and efficiently determines the desired interpolation values for the X, Y and Z factors. The desired ultimate output interpolation value (point) corresponding to the XYZ space is labelled as [(XYZ–YZ)–(XZ–Z)]–[(XY–Y)–(X–0)] in FIG. 5, which corresponds to a reference point 49 in FIG. 6.

Figure 6:
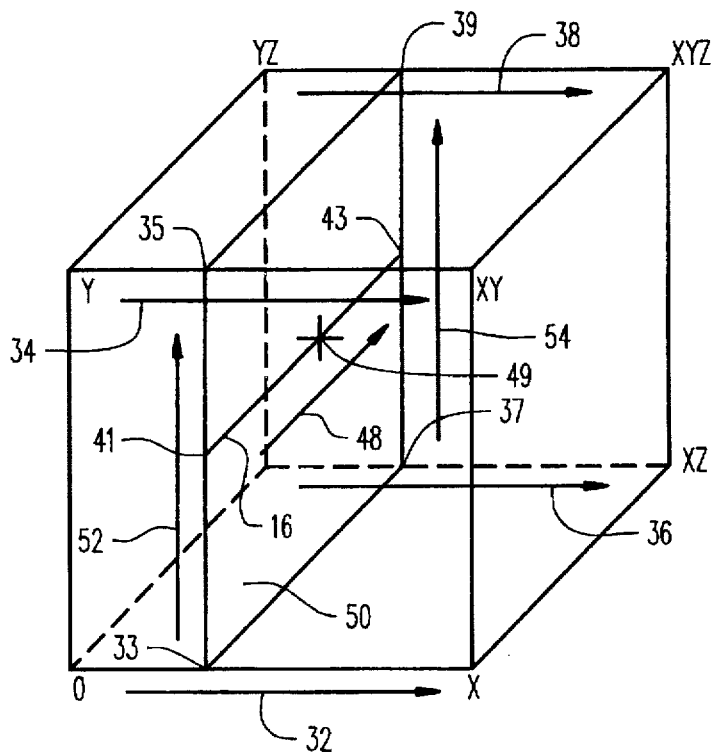
FIG. 6 depicts an analysis of the three dimensional color space of FIG. 5 to arrive at a desired output value.

FIG. 6 provides a graphic depiction of how the image data space shown in FIG. 5 might be processed to determine the interpolation values in each of the X, Y, and Z dimensions. Processing of the data represented by such a space might be performed by the three-stage interpolation unit depicted in FIG. 4. Processing indicated by various reference numbers in FIG. 6 corresponds to the same reference numbers in FIG. 4.

In accordance with a preferred embodiment of the invention, the interpolation unit arrangement in FIG. 4 first processes the image data in the X dimension. That is, interpolation processing is performed for each of four pairs of points: (0,X), (Y,XY), (Z,XZ), and (YZ,XYZ), which define respective distances in the direction of the X dimension. It is to be noted that, although depicted as being equal in FIG. 6, each of these four X-dimension distances might be different in a non-linear system, such as a typical color space. For this reason, each of the four distances defined by the respective pairs of points is individually processed. This X-axis processing is depicted in FIG. 6 by respective arrows 32, 34, 36 and 38, corresponding to the four X-dimension distances. The corresponding processing in the interpolation unit of FIG. 4 is shown at reference numerals 32, 34, 36 and 38. More particularly, an array 40 of four IU processors performs interpolation in the X-dimension. In FIG. 4, the interpolation values obtained for each of the X-axis distances, defined by the above-given pairs of points, are given by $V_{X-0}$, $V_{XY-Y}$, $V_{XZ-Z}$, and $V_{XYZ-YZ}$, which correspond to output values 33, 35, 37 and 39, respectively. FIG. 6, accordingly, depicts the interpolation values $V_{X-0}$, $V_{XY-Y}$, $V_{XZ-Z}$, and $V_{XYZ-YZ}$, respectively, at points 33, 35, 37 and 39 on the X-axis edges of the depicted space. The image data, over which subsequent Y and Z dimensional interpolation processing occurs, is constrained to a two-dimensional space 50, e.g. a plane in a linear system, whose corners are defined by points 33, 35, 37 and 39. Consequently, subsequent processing is simplified as it is limited to the two-dimensional space 50.

Processing next occurs in the Y dimension. Such processing is simplified in that it will be constrained to those Y-axis values which lie in the two-dimensional space 50 defined by the data values $V_{X-0}$, $V_{XY-Y}$, $V_{XZ-Z}$, and $V_{XYZ-YZ}$ (points 33, 35, 37 and 39, respectively). Processing for the Y-dimension values is performed in the Y-axis dimension of the space 50, as shown by arrows 52 and 54. Such Y directional processing is conducted in accordance with a known Y dimensional transform $F_Y$, to determine the interpolation values in the Y dimension with respect to the values defined within points 33 and 35, and 37 and 39, respectively. Corresponding Y-dimensional processing in the interpolation unit of FIG. 4 is shown by the two IUs of a second-stage array 42 which produce values 41 and 43. The result of the Y-dimensional processing is given by the interpolation values $V_{(XY-Y)-(X-0)}$ and $V_{(XYZ-YZ)-(XZ-Z)}$ depicted in FIG. 6 at points 41 and 43, respectively.

The interpolation values given by Y-dimensional processing determine a one-dimensional line 16, defined by points 41 and 43, over which the Z dimensional values are analyzed to determine the interpolation value for the Z-dimension. Processing of the Z dimensional interpolation value is conducted in accordance with a known Z dimensional transform $F_Z$. Such Z dimensional processing corresponds to the arrow 48. This processing is carried out in a third stage 44 of the processor, which contains a single interpolation unit. The ultimate result is given as $V_{[(XYZ-YZ)-(XZ-Z)]-[(XY-Y)-(X-0)]}$ which is depicted at point 49 in FIG. 6, and represents the (X,Y,Z) value to be used for output purposes.

Hence, it can be seen that utilizing a multi-stage structure to interpolate multidimensional data significantly increases the simplicity of processing by reducing the space, or range over which subsequent interpolation processing is to occur, rather than processing each of the dimensions over the entire range of each dimension.

An additional advantage provided by the present invention is the fact that input data may be "pipelined" in the multi-stage interpolation unit. When color values are interpolated, each component of the color value is separately processed. For example, if the destination color space is CMYK, each of the cyan, magenta, yellow and black components of the input data points are separately processed, typically in sequence. In the processor of the present invention, after a data value corresponding to a first component of a pixel is processed in the X-dimension by IU array 40 to generate output values 33, 35, 37, and 39, the IU array 40 may immediately be loaded with input data for a second component of the pixel. Hence, immediately following generation of X-dimensional output values 33, 35, 37, and 39, for one component input data corresponding to the next component can be processed in the IU array 40 for X-dimensional interpolation at the same time that the data for the first component is undergoing Y-dimensional interpolation in the second stage 42. At the next step, the image data for three component values of a pixel can be simultaneously interpolated at the same time for the three dimensions, respectively.

Different mechanisms can be employed to carry out the invention. Any suitable software, firmware, or hardware arrangement sufficient to bring about a desired result will suffice. In software, the invention may be carried out by providing a parallel processing structure wherein each stage of processing is dedicated to one of the input dimensions. In a pipelined arrangement, a particular transform can be fed directly into the processing stage involved with its particular dimension. The same can be said of firmware arrangements.

In hardware, the necessary logic can be implemented in any number of ways. The basic premise is to provide a multi-stage structure with an appropriate number of stages to provide analysis for an appropriate number of dimensions. Hardware embodiments for carrying out the invention include field programmable logic arrays and application-specific integrated circuits (ASICs). However, the particular arrangement in which the invention is carried out is not critical.

Although the elements of the present invention have been described in a conjunction with certain embodiments, it will be appreciated that the invention may be implemented in a variety of other ways. Consequently, it is to be understood that the particular embodiments shown and described by way of illustration should in no way be considered limiting.

We claim:

1. An interpolation device for processing N dimensional input image data according to a transfer function, the interpolation device comprising:

first interpolation units for processing the input image data in a first dimension for producing first output data which is constrained in the first dimension;

second interpolation units for processing the first output data in a second dimension to produce second output data which is further constrained in the second dimension; and additional interpolation units for processing the second and subsequent corresponding output data in remaining dimensions to ultimately produce output data which is constrained to a single value.

2. A device for determining an N-dimensional interpolation output value based on N-dimensional input data, comprising:

N contiguously linked arrays each containing at least one interpolation unit, each array being dedicated to evaluating interpolation values in one of the N-dimensions, and wherein no two arrays process data in a same dimension; wherein processing output from each array constitutes input into a next succeeding array, such that the Nth array produces the N-dimensional interpolation output value.

3. An interpolation device for processing input color image data corresponding to a source device to produce output color image data corresponding to a destination device, wherein the input and output color image data are characterized by at least first and second dimensions, the interpolation device comprising:

at least one first interpolation unit, for processing the input color image data according to a first dimension to produce first output data which is constrained in the first dimension; and at least one second interpolation unit, for processing the first output data according to a second dimension to produce second output data which is constrained in the second dimension.

4. The interpolation device of claim 3 wherein said image data has at least three dimensions, and further including at least one third interpolation unit, for processing the second output data according to a third dimension to produce third output data which is constrained to a single value.

5. The device as described in claim 4, wherein said three dimensions respectively correspond to the three components of a Cie-based, device independent, color space.

6. The device as described in claim 4, wherein said color image data dimensions respectively correspond to one of each of red, green and blue color data.

7. A method for preparing output data for reproduction on a destination device by interpolation of N-component input data from a source device, comprising the steps of:

interpolating the input data with respect to a first component to produce first output data which is constrained to a limited range of values of the first component;

interpolating the first output data with respect to a second component to produce second output data which is constrained to a limited number of values of the second component;

interpolating the second and subsequent output data with respect to corresponding components to produce corresponding output data which is constrained to a limited range of values for each of the N components.

8. A method for producing output data by interpolating N-dimensional input data, wherein the method comprises:

interpolating the input data in a series of steps wherein at each step input data is analyzed with respect to one of each of the N dimensions and output from each of the steps is confined with respect to its associated dimension and is passed to a next step as input, to produce final output data which is constrained to a single value for each of the N dimensions.

9. A method for interpolating color image input data from a first device to provide color image output data for a second device, wherein the color image input data is characterized by at least a first, a second and a third graphically represented parameter, each of which corresponds to a first, a second and a third dimensional representation, the method comprising the steps of:

interpolating the color image input data according to the first dimension to produce first output data which is constrained to a limited number of values in the first dimension;

interpolating the first output data according to the second dimension to produce second output data which is constrained to a limited number of values in the second dimension;

interpolating the second output data according to the third dimension to produce third output data which is constrained to a single value in each of the three dimensions;

providing the third output data to the second device.

10. A method for interpolating color image input data from a source device to provide color image output data for a destination device, wherein the color image input data corresponds to an X, a Y and a Z dimensional representation to define a color space, the method comprising the steps of:

interpolating the color image input data in the X dimension according to a known X-dimensional transform to produce first output data, which first output data defines a two dimensional space;

interpolating the first output data in the Y dimension according to a known Y dimensional transform to produce second output data, which second output data defines a line in the two dimensional space corresponding to the first output data;

interpolating the second output data in the Z dimension according to a known Z-dimensional transform to produce third output data, which third output data defines a point on the line corresponding to the second output data;

providing the third output data to the destination device.

11. An interpolation device for performing N-dimensional parallel processing of input data, which input data is characterized by N components, comprising:

a series of interpolation unit stages, wherein each interpolation unit stage processes input data in one of the N dimensions, and wherein output from a first through an (N−1)th stage constitutes input to a next succeeding stage such that the input data is successively constrained in one dimension at each stage and the final stage produces output data that is constrained in all N dimensions.

* * * * *